(12) United States Patent
Rabinovitch

(10) Patent No.: US 10,426,214 B2
(45) Date of Patent: *Oct. 1, 2019

(54) PROTECTIVE HEAD GEAR WITH MOVEABLE MEMBERS

(71) Applicant: Noam Rabinovitch, Nepean (CA)

(72) Inventor: Noam Rabinovitch, Nepean (CA)

( * ) Notice: Subject to any disclaimer, the term of this patent is extended or adjusted under 35 U.S.C. 154(b) by 586 days.

This patent is subject to a terminal disclaimer.

(21) Appl. No.: 15/090,942

(22) Filed: Apr. 5, 2016

(65) Prior Publication Data

US 2016/0213087 A1    Jul. 28, 2016

Related U.S. Application Data

(63) Continuation of application No. 13/304,018, filed on Nov. 23, 2011, now Pat. No. 9,307,801.

(51) Int. Cl.
| | |
|---|---|
| *A42B 3/12* | (2006.01) |
| *A42B 3/04* | (2006.01) |
| *A63B 24/00* | (2006.01) |
| *G01P 15/00* | (2006.01) |

(52) U.S. Cl.
CPC ............. *A42B 3/127* (2013.01); *A42B 3/046* (2013.01); *A42B 3/122* (2013.01); *A63B 24/00* (2013.01); *G01P 15/00* (2013.01)

(58) Field of Classification Search
CPC .......... A42B 3/122; A42B 3/127; A42B 3/046
USPC ............................................ 2/421, 413, 415
See application file for complete search history.

(56) References Cited

U.S. PATENT DOCUMENTS

| | | | |
|---|---|---|---|
| 7,150,048 B2 | 12/2006 | Buckman | |
| 7,603,725 B2 | 10/2009 | Harris | |
| 9,307,801 B2* | 4/2016 | Rabinovitch | .......... A42B 3/046 |
| 9,439,469 B2* | 9/2016 | Phipps | .................... A42B 3/064 |
| 2005/0268383 A1* | 12/2005 | Harris | .................... A42B 3/121 |
| | | | 2/413 |
| 2008/0030010 A1 | 2/2008 | Millet Lopez | |
| 2010/0083424 A1* | 4/2010 | Linares | ................ A42B 3/0473 |
| | | | 2/413 |
| 2011/0219852 A1 | 9/2011 | Kasten | |
| 2014/0143940 A1 | 5/2014 | Iuliano et al. | |

FOREIGN PATENT DOCUMENTS

| | | |
|---|---|---|
| EP | 0850575 A1 | 7/1998 |
| WO | 9108682 A1 | 6/1991 |

* cited by examiner

*Primary Examiner* — Katherine M Moran
(74) *Attorney, Agent, or Firm* — Occhiuti & Rohlicek LLP

(57) ABSTRACT

Disclosed are devices, systems, methods, products, and implementations, including a head gear device that includes a helmet adapted to be worn by a user, at least one sensor to measure one or more of, for example, force and/or motion, and one or more moveable members, the one or more moveable members configured to be displaced to apply a counterforce to a head of the user based, at least in part, on detection of one or more of, for example, a force component applied to the user and/or motion undergone by the user.

14 Claims, 6 Drawing Sheets

PROTECTIVE HEAD GEAR WITH MOVEABLE MEMBERS

CROSS-REFERENCE TO RELATED APPLICATIONS

This application is a continuation application of, and claims priority to, U.S. patent application Ser. No. 13/304,018, entitled "PROTECTIVE HEAD GEAR WITH MOVEABLE MEMBERS," and filed Nov. 23, 2011, the content of which is incorporated herein by reference in its entirety.

BACKGROUND

Incidences of concussion injuries are on the rise amongst participant of such sports as hockey, football, etc. In professional sports, such as the National Hockey League (NHL), as hockey players progressively become bigger, stronger and faster, they become far more susceptible to injury than in the past, with concussions playing a more dominant role in the cause of long-term, debilitating injuries.

A concussion is a brain injury in which the brain moves inside the skull and collides with the protective bone as a result of an impact to the head. The concussion-causing impact is usually of a specific magnitude and location, meaning that not all head impacts cause concussions. Concussions are graded according to symptoms and range from Grade I (mild symptoms such as short-term confusion) to Grade III (loss of consciousness). Depending on the grade of severity, recovery period can last from a few days to a number of weeks.

Aside from the obvious human cost of having a person deal with a serious brain injury and all of the present and future health effects that it entails, there is also a business and financial cost associated with such an injury to a professional player's team as well as to the professional league as a whole. Furthermore, head injuries also have a cumulative effect on the brain, meaning the more concussions a player sustains, the worse off his present and future symptoms will be and the longer he/she will take to recover each time. Eventually, a player that has sustained numerous concussions may be forced to prematurely end his/her career.

SUMMARY

The devices, methods, products, and implementations described herein can mitigate an injury sustained by a user (e.g., a player participating in a contact sports) to make it less severe than the injury would have been had it been sustained without application of counter-striking force, e.g., by actuatable moveable members of a head gear device. For example, the devices, methods, products, and implementations described herein can turn a grade III concussion into a grade I, or can make the rehabilitation time from an injury, caused as a result of application of an external physical force, to be substantially shortened when the using the devices, methods, products, and implementations described herein.

In some embodiments, a head gear device is provided. The head gear device includes a helmet adapted to be worn by a user, at least one sensor to measure one or more of, for example, force and/or motion, and one or more moveable members, the one or more moveable members configured to be displaced to apply a counterforce to a head of the user based, at least in part, on detection of one or more of, for example, a force component applied to the user and/or motion undergone by the user.

Embodiments of the device may include at least some of the features described in the present disclosure, including one or more of the following features.

The at least one sensor may include a sensor, coupled to the helmet, configured to detect a force component applied to the helmet.

The at least one sensor may include one or more of, for example, an inertia sensor, a contact sensor, a pressure sensor, a force sensor, an accelerometer, and/or a proximity sensor.

At least one of the one or more moveable members may be configured to be displaced in response to a determination that the force component applied to the user exceeds a pre-determined force threshold.

At least one of the one or more moveable members may be positioned at an inner surface of the helmet.

The one or more moveable members may include at least one inflatable bag configured to be controllably inflated in a direction approximately opposite an impact direction at which the detected force component was applied, the at least one inflatable bag inflated with a force related to a magnitude of the detected force component measured by the at least one sensor.

The one or more moveable members may include at least one motor to controllably actuate a shaft coupled to a moveable pad, the controllably actuated shaft configured to cause the moveable pad to be displaced in a direction approximately opposite an impact direction at which the detected force component was applied, the moveable pad displaced with a displacement force related to a magnitude of the detected force component measured by the at least one sensor.

The one or more moveable members may include at least one controllably actuated piezoelectric element mechanically coupled to a moveable pad, the controllably actuated piezoelectric element configured to cause the moveable pad to be displaced in a direction approximately opposite an impact direction at which the detected force component was applied, the moveable pad displaced with a displacement force related to a magnitude of the detected force component measured by the at least one sensor.

The one or more moveable members may include at least one controllably actuated pneumatic piston mechanically coupled to a moveable pad, the controllably actuated pneumatic piston configured to cause the moveable pad to be displaced in a direction approximately opposite an impact direction at which the detected force component was applied, the moveable pad displaced with a displacement force related to a magnitude of the detected force component measured by the at least one sensor.

In some embodiments, a method is provided. The method includes detecting one or more of, for example, a force component applied to a user and/or motion undergone by the user, and causing one or more moveable members coupled to a helmet adapted to be worn by the user to be displaced to apply a counterforce to a head of a user based, at least in part, on the detected one or more of, for example, the force component applied to the user, and/or the motion undergone by the user.

Embodiments of the method may include at least some of features described in the present disclosure, including at least some of the features described above in relation to the device, as well as one or more of the following features.

Detecting the force component applied to the user may include detecting the force component applied to the user using at least one sensor coupled to the helmet, the at least one sensor configured to detect a force component applied to the helmet.

Detecting the force component may include detecting the force component using one or more of, for example, an inertia sensor, a contact sensor, a pressure sensor, a force sensor, an accelerometer, and/or a proximity sensor.

Causing the one or more moveable members to be displaced may include causing at least one of the one or more moveable members to be displaced in response to a determination that the detected force component applied to the user exceeds a pre-determined force threshold.

At least one of the one or more moveable members may be positioned at an inner surface of the helmet.

Causing the one or more moveable members to be displaced may include controllably inflating at least one inflatable bag to cause the at least inflatable bag to inflate in a direction approximately opposite an impact direction at which the detected force component was applied, the inflatable bag configured to be inflated with a force related to a magnitude of the detected force component.

Causing the one or more moveable members to be displaced may include controllably actuating a shaft coupled to a moveable pad to cause the moveable pad to be displaced in a direction approximately opposite an impact direction at which the detected force component was applied with a displacement force related to a magnitude of the detected force component.

Causing the one or more moveable members to be displaced may include controllably actuating a piezoelectric element mechanically coupled to a moveable pad to cause the moveable pad to be displaced in a direction approximately opposite an impact direction at which the detected force component was applied with a displacement force related to a magnitude of the detected force component.

Causing the one or more moveable members to be displaced may include controllably actuating a pneumatic piston mechanically coupled to a moveable pad to cause the moveable pad to be displaced in a direction approximately opposite an impact direction at which the detected force component was applied with a displacement force related to a magnitude of the detected force component.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About," as used herein when referring to a measurable value such as an amount, a temporal duration, and the like, is meant to encompass variations of ±20% or ±10%, ±5%, or +0.1% from the specified value, as such variations are appropriate to in the context of the systems, devices, and methods described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

Other and further objects, features, aspects, and advantages of the present disclosure will become better understood with the following detailed description of the accompanying drawings.

BRIEF DESCRIPTION OF THE DRAWINGS

These and other aspects will now be described in detail with reference to the following drawings.

Like reference symbols in the various drawings indicate like elements.

DETAILED DESCRIPTION

Disclosed herein are headgears, devices, methods, and various implementations, including a head gear device that includes a helmet adapted to be worn by a user, at least one sensor to measure one or more of, for example, force and/or motion, and one or more moveable members, the one or more moveable pads configured to be displaced to apply a counterforce to a head of the user based, at least in part, on detection of one or more of, for example, a force component applied to the user and/or motion undergone by the user.

Figure 1:
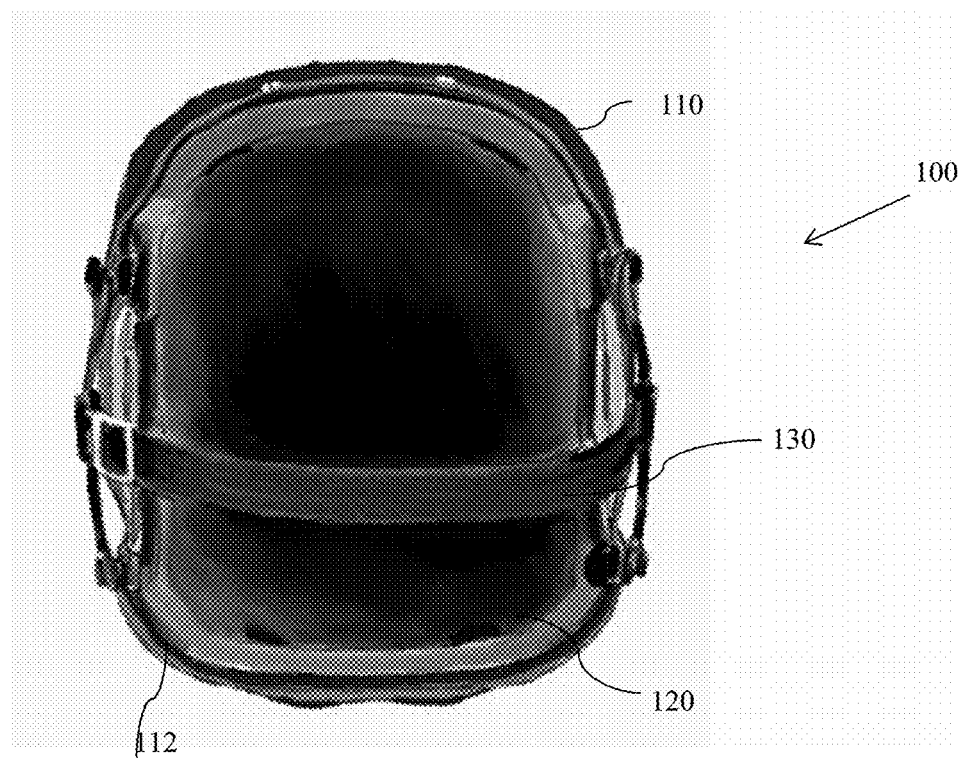
FIG. 1 is a diagram of a head gear device.

With reference to FIG. 1, a diagram of a head gear device 100 is shown. The head gear device 100 includes a helmet, including a shell 110 with an inner surface 112, structured to be worn by a user. For example, hockey helmets configured in a manner similar to that described herein may be bowl-shaped, and structured to be fitted on the head of the user. The shell 110 of the head gear device is generally constructed from a strong/rigid, but relatively light material, such as, for example, polycarbonate materials, polyethylene, and/or other types of suitable material. The materials from which the shell 110 is constructed are generally configured to absorb or diffuse at least a portion of forces applied to the shell 110 such that the forces applied to the shell 110 are generally not transferred in their entireties to the user wearing the head gear 100. In some embodiments, the head gear 100 may also include a visor or some other type of a face shield that is secured to the shell (e.g., by screws, or by using some other fastening mechanism). A strap 130 may also be attached to the shell to enable properly securing the head gear 100 to the head of the user. The head gear may include other features such as venting openings defined at various locations on the shell 110. Additionally, in some implementations, a lining material 120, such as a soft fabric, foam, etc., may be lined at least over a portion of the area of the inner surface 112 of the shell 110 to increase the comfort level of the user wearing the head gear 100 and to absorb or diffuse at least part of the external force applied to the user or the helmet.

Figure 2A:
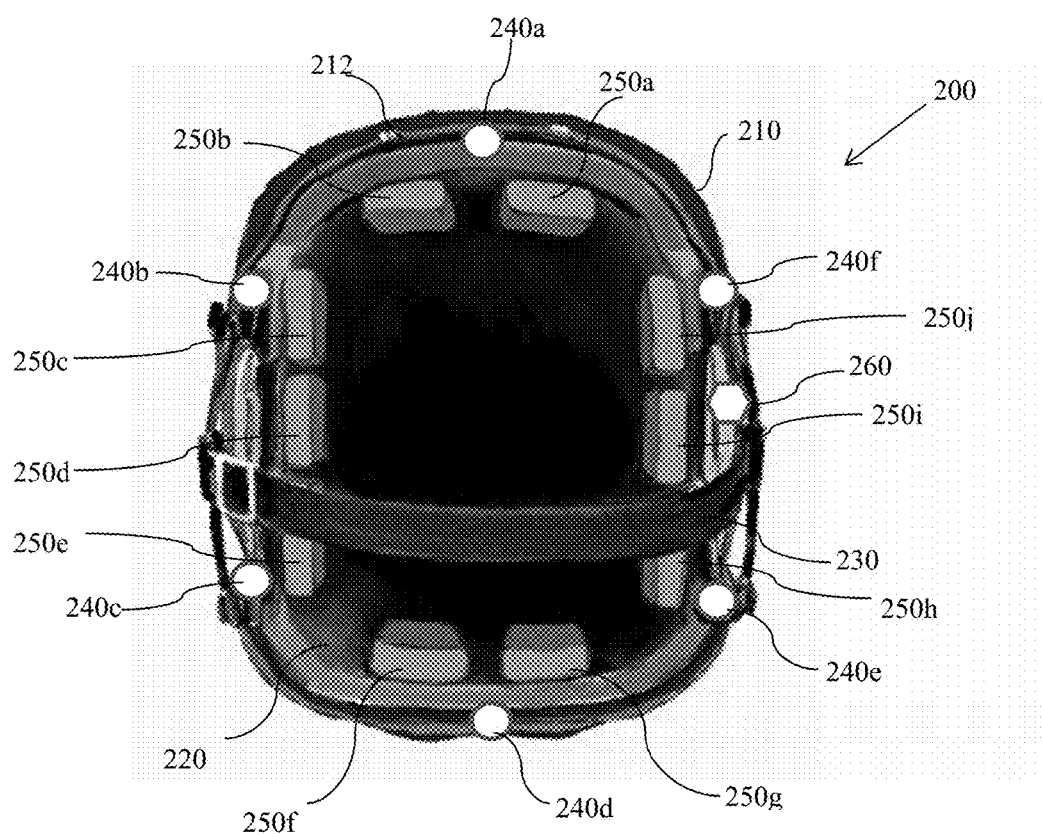
FIG. 2A is a diagram depicting an inner portion of an example head gear.

With reference to FIG. 2A, a diagram depicting the inner portion of an example head gear 200 (which may be similar to the head gear 100 of FIG. 1) is shown. The head gear 200 includes a shell 210 (e.g., a bowl-shaped shell) with an inner surface defining a cavity adapted to be fitted on the head of the user. The head gear 200 also include a lining material 220 lined over at least a portion of the inner surface of the shell 210, and a strap 230 securable to the shell 210 in at least two locations so as to enable the user to secure the head gear 200 to his/her head. As further shown in FIG. 2A, the head gear 200 also includes one or more sensors 240*a-f*, depicted schematically in FIG. 2 as circles, that are each configured to detect force and/or motion that is applied to, or undertaken by, the head gear 200 or the user wearing it. The sensors may be embedded in the shell 210, or may be secured to the shell 210 at its inner surface 212 or exterior surface. For example, the one or more sensors 240*a-f* may be secured to the shell 210, e.g., through adhesives, pressure fitting the sensors into slots defined in the shell 210, attaching the sensors to the shell using screws or some other fastening mechanism, and/or embedding the one or more sensors into the shell so that the sensors, or at least one or some of them, are not visible. Furthermore, in some embodiments, at least one of the sensors may be positioned remotely from the head gear 200, e.g., a sensor worn on the user's jersey, foot gear (such as a player's skates), or elsewhere on the user's equipment. The one or more sensors 240*a-f* that are configured to detect motion undertaken by and/or forces applied to the shell 210 may include, in some implementations, one or more of, for example, an inertia sensor, a contact sensor, a pressure/force sensor, an accelerometric sensor (i.e., an accelerometer), a proximity sensor, a motion sensor capable of determining the direction of motion, etc. Although FIG. 2A depicts six (6) sensors coupled to the shell 210 of the head gear device 200, fewer or more sensors may be used.

Figure 4:
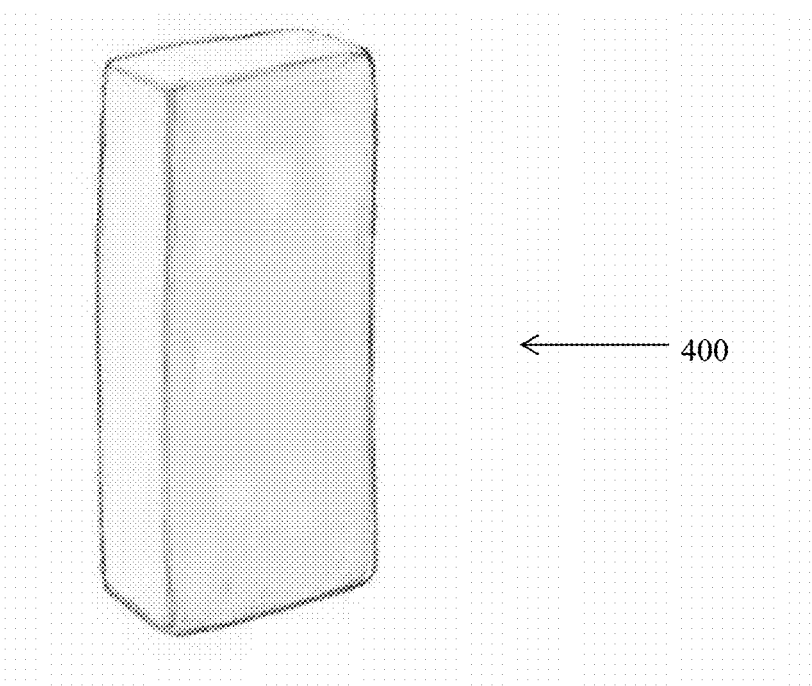
FIG. 4 is a diagram of an example embodiment of a pad.

As additionally depicted in FIG. 2A, the head gear device 200 also includes one or more moveable members 250*a-j* that are configured to be displaced to apply a counterforce to a head of the user based, at least in part, on detection of a force component applied to the user and/or to the head gear 200, and/or detection of motion undergone by the user. Although FIG. 2A depicts ten (10) moveable members coupled to the shell 210 of the head gear device 200, fewer or more moveable members may be used. In some embodiments, at least one of the moveable members may include a moveable pad made of, or covered with, soft foam material, or some other similar suitable material structured to avoid causing injury to the user. The moveable pad may be coupled to a displaceable structure, such as a piston, e.g., pneumatic piston/cylinder, electro/mechanical piston, a piezoelectric-based piston/actuator, etc.) FIG. 4 is a diagram of an example embodiment of a pad 400 that may be used in the implementations described herein.

Upon impact of an external force (be it physical contact delivered by another player, the detection of movement of the user's head towards the playing surface, or some other type of applied physical force), a control system activates at least one of the moveable members 250*a-j* positioned in the head gear device 200 to cause the contact surface of the at least one moveable member (e.g., the foam pad coupled to the end of a piston) to move in a direction that is generally in a direction opposite the direction at which the external force was applied (or will be applied, in situations in which movement of the head towards a collision with the playing surface is detected) to the user. For example, in implementations in which a piezoelectric actuator is used, upon detection of force component a controller 260 (depicted schematically as a hexagon in FIG. 2A) generates a control signal(s) that is communicated to the piezoelectric actuator to be controlled. The control signal causes application of a computed electrical voltage to be applied to the piezoelectric element of the actuator device that causes displacement of the piezoelectric element in accordance with the computed electrical voltage, which in turn causes a pad, or pads, for example, to be controllably displaced to counter the detected force component.

Figure 2B:
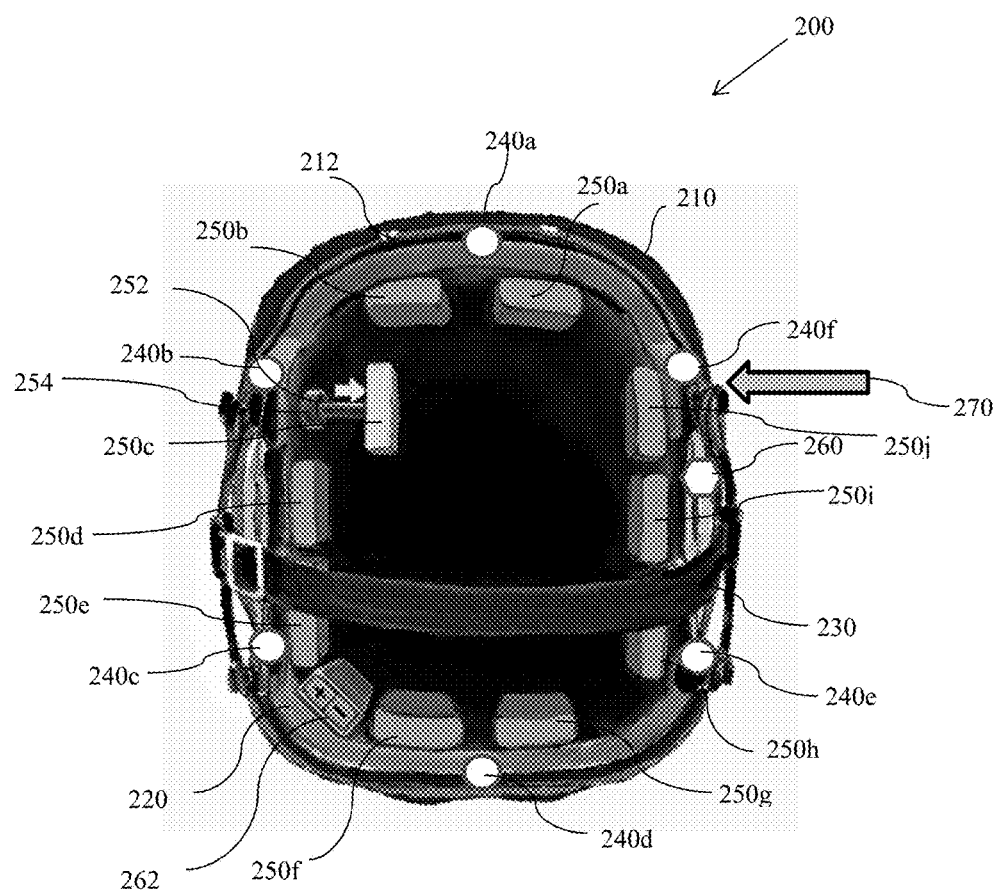
FIG. 2B is a diagram showing operation of a moveable member of the head gear of FIG. 2A.

The head gear device 200 may also include a power source 262 (as depicted in FIG. 2B, discussed below) to power one or more of the controller 260, the moveable members 250*a-j*, and/or the sensors 240*a-f*. In some implementations, the shell 210 of the head gear device 200 may be structured to be a little thicker, but not to the point of being uncomfortable for the wearer, than the usual standard helmet so as to provide the proper supporting structure to enable coupling of sensors, moveable members, and/or the power source, such as those described herein, to the shell 210.

Figure 5:
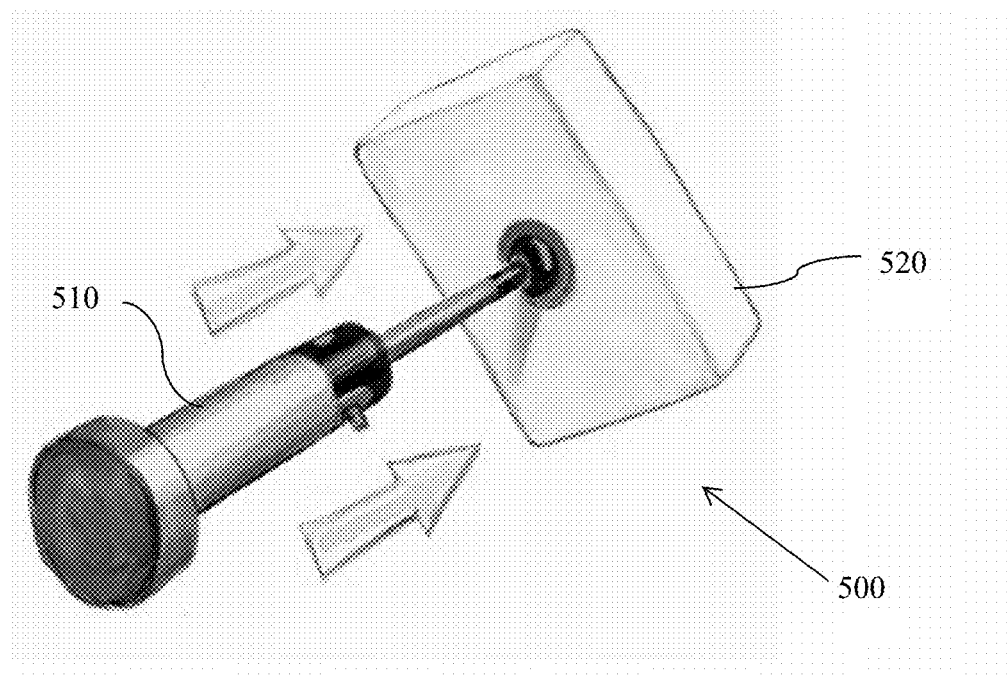
FIG. 5 is a diagram of an example moveable member that includes a pneumatic piston/cylinder coupled to a pad.

With reference to FIG. 2B, showing operation of a moveable member from the multiple moveable members of FIG. 2A, in response to detection of a force component 270 (e.g., by the sensor 240*f*, which may be a pressure-sensor, or some other type of a suitable sensor), the controller receives information representative of the location and/or magnitude of the detected force component 270 and determines which of the moveable members need to be displaced to counter the detected force, and to what extent they need to be displaced. Thus, in the example of FIG. 2B, the controller may determine that only the moveable member 250*c* needs to be actuated to counter the force 270, and accordingly, the controller 260 generates a control signal that is provided to the displaceable structure of the moveable member 250*c*. For example, in implementations where the displaceable structure of the moveable member 250*c* may be an piezoelectric actuator, the control signal may cause an appropriate determined voltage level to be applied to a piezoelectric element to thus cause the element, and the pad coupled to it, to be displaced in a direction that is substantially or approximately, opposite the direction of the force 270 to produce a counterforce component 272.

Where other types of displaceable structures are used, for example, a pneumatic piston/cylinder, which may be similar to a pneumatic piston 510 coupled to a pad 520 of a moveable member 500 depicted in FIG. 5, the control signal provided by a controller may enable control of the amount of gas (e.g., air) applied to the cylinder/piston of the selected moveable member to cause the cylinder/piston to move.

In a further example, the one or more moveable members 250*a-j* may include at least one inflatable bag or balloon (with dimensions proportional to the size of the head gear device) coupled to a source of gas. Upon detection of an external force applied to the head gear device 200 and/or to the user (or detection of motion of the user that will result in a collision with another object, such as a playing surface), and a determination that a moveable member implemented as an inflatable bag/balloon is to be activated to generate a counter-force, control signal(s) from the controller 260 may cause controllable release of gas (e.g., air or some other suitable gas) to be directed into the interior of the bag/balloon to cause controllable inflation of the bag/balloon to counter the detected force component.

In yet another example, the one or more moveable members 250*a-j* may include a pad coupled to a controllably actuated shaft (such as a shaft 252 shown in FIG. 2B) that can be displaced using an electromechanical motor (such as a motor 254 shown in FIG. 2B). The controllably actuated shaft is configured to cause the moveable pad to be displaced in a direction substantially or approximately opposite the direction at which the detected force component was applied with a displacement force (i.e., magnitude) related to a magnitude of the detected force component measured by at least one of the sensors (e.g., with 10%, 20%, 50%, or 100% of the magnitude of the impact force, or any appropriate value that would counteract the effect of the external force or impact the user is or will be subjected to).

In some embodiments, moveable members that are not necessarily substantially or approximately opposite the direction of the detected applied external force may be activated. For example, a determination may be made (e.g., by the controller) that several moveable members flanking a moveable member that is substantially or approximately opposite the location where the external force was applied should be activated so as to cover a larger area of the head that is to be subjected to the counterforce created by the moveable members activated.

As noted, in some embodiments, activation/actuation of the at least one of the one or more moveable members 250a-j may be performed in response to detection of motion undergone by the user. For example, if it is determined that, as a result of a powerful hit delivered by another player, the user has undergone sudden acceleration, or that the direction of the user's head or body is such that the user is about to hit the playing surface or some other object, a determination may be made, for example, by the controller 260, that a large portion (or even all) of the moveable members need to be activated/actuated to protect against impact of the user with the playing surface or some other object.

In some implementations, the control system is configured to determine and cause the at least one moveable member to be applied to the user with a force magnitude that is related to the external force applied to the user. For example, in some embodiments, the striking pad (or pads) may strike the user with a force that is close to the magnitude of the external force (as determined, for example, by a force measurement system that may include the at least one sensor), or may be some fraction (10%, 20%, etc.) of the magnitude of the external force that is sufficient to counteract the external force without causing injury to the user. In some embodiments, for example, where the moveable members are implemented using an inflatable bag/balloon, the bag/balloon may be expanded to an extent that would result in the inflating bag/balloon applying counterforce with a magnitude that is based, or is related to, the magnitude of the applied external force or the direction and extent of detected motion of the user (e.g., some fraction of the magnitude of the external force).

In some implementations, to avoid situations where the moveable members might be frequently activated/actuated in response to insignificant forces that would not cause injury to the user (e.g., as a result of incidental and harmless contact of the user with another user), at least one of the one or more moveable members is configured to be displaced in response to a determination that the force component applied to the user or to the head gear device 200 exceeds a pre-determined force threshold. Thus, only when the external force detected by the sensor(s) exceeds some pre-determined level deemed to be dangerous is the moveable member(s) activated and/or actuated to cause a counterforce. Similarly, activation of any of the moveable members may be performed only when detected motion of the user (e.g., sudden acceleration or detection of motion directed towards the playing surface) exceeds some pre-determined parameter value.

After striking the user, the striking at least one moveable member (e.g., the moveable member 250c in FIG. 2B) may be retracted or reset (e.g., releasing gas used to inflate an inflatable bag-based moveable member, releasing gas used to drive the piston of a pneumatic-piston-based moveable member, etc.) and be returned to an initial (resting) position.

In some embodiments, the controller 260 depicted schematically in FIGS. 2A and 2B, may be implemented using a processor-based device. Such a processor-based device can receive control input data (e.g., data representative of location and/or magnitude of force component(s) detected/measured by at least one of the one or more sensors 240a-f), and based on the input data, generate control signals to control the operation of the one or more moveable members, e.g., control/regulate actuation of the one or more moveable members by, for example, controlling the level of voltage applied to piezoelectric-based actuators, controlling the level/volume of gas released into pneumatic piston-based device and/or inflatable bag-based devices, and/or controlling the extent of actuation of electromechanical motors. The processor-based device may include a computer and/or other types of processor-based devices suitable for multiple applications. Such devices may include volatile and non-volatile memory elements, and peripheral devices to enable input/output functionality. Such peripheral devices include, for example, a CD-ROM drive and/or flash drive, or a network connection, e.g., implemented using a USB port or using a WiFi or other wireless transceiver, for downloading related content. Such peripheral devices may, for example, be used for downloading software containing computer instructions to enable general operation of the controller, and for downloading software implemented programs to perform operations to control, for example, application of counter force in response to determination of location and magnitude of force applied to the head gear device 200 or to the user, and/or detection of motion undergone by the user.

A processor-based device used in implementations of a controller such as the controller 260 may be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, flash drives, memory, Programmable Logic Devices (PLDs)) used to provide machine instructions and/or data to a programmable processor, including a non-transitory machine-readable medium that receives machine instructions as a machine-readable signal.

To provide for interaction with a user, in some embodiments, the controller 260 may be coupled to a display device (e.g., a CRT (cathode ray tube) or LCD (liquid crystal display) monitor) for displaying information to the user, and a keyboard and/or a pointing device (e.g., a mouse or a trackball) by which the user may provide input to the computer. Such interactive devices may be located remotely from the controller 260 and may be used to configure the controller 260 as needed or desired by operators (e.g., a technician). Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The various illustrative logical blocks, modules, circuits, and methods described in connection with the above described figures and the embodiments disclosed herein can often be implemented as electronic hardware, computer software, or combinations of both.

Additionally, the methods/procedures described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such that the processor can read information from, and write information to, the storage medium. In the alternative, the storage medium can be integral to the processor. The processor and the storage medium can also reside in an ASIC.

In some embodiments, the controller 260 may be coupled to the head gear device (e.g., it may be secured to the shell 210 of the head gear device, or embedded into the shell 210). Additionally and/or alternatively, in some embodiments, the controller 260 may be located remotely from head gear device. For example, the controller 260 may be secured to the uniform of the user, or may be located remotely from the user him/herself. Where the controller 260 is located remotely from the head gear device 200, the head gear device may also include a communication module, such as a transceiver, to transmit wireless or wired data to the controller for further processing of the data (e.g., data representative of detected forces and/or motion). The remotely located controller 260 may then transmit back to the transceiver of the head gear device resultant control signals to control operation of at least one of the one or more moveable members 250*a-j* of the head gear device 200.

The devices, systems, methods, products, and implementations described herein may be used in various fields and applications, including in such contact sports where head and brain injuries may occur, notably hockey, football, rugby, lacrosse, wrestling, and/or amateur boxing. Other fields and applications in which the devices, systems, methods, products, and implementations described herein may be used include any activity requiring protective head gear, such as when operating vehicles such as sports cars, motor cycles, etc., when skiing, when wearing head gear at constructions sites and mines, in situations involving military uses, etc.

Figure 3:
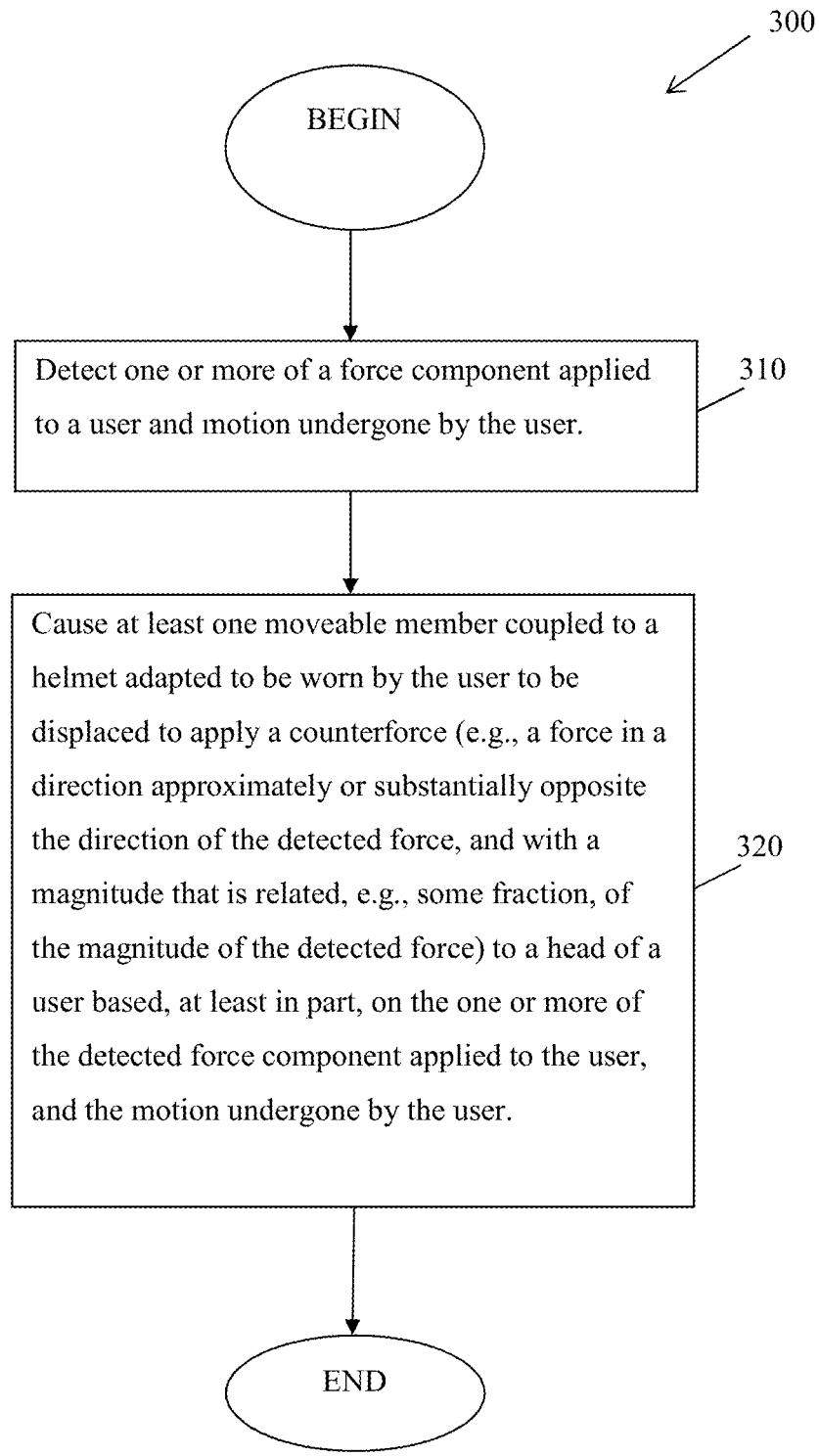
FIG. 3 is a flowchart of an example procedure to protect a user from injury resulting from application of external force or from uncontrolled sudden motion.

With reference to FIG. 3, a flowchart of an example procedure 300 to protect a user from injury resulting from application of external force or from uncontrolled sudden motion is shown. The procedure 300 includes detecting 310 one or more of, for example, a force component that is applied to the user (e.g., force applied to a head gear device, such as the head gear device 200 of FIGS. 2A and 2B worn by the user) and/or of motion undergone by the user. Detection of force components, or of motion undergone by the user, may be performed, in some embodiments, using at least one force/motion detector, which may include one or more of, for example, an inertia sensor, a contact sensor, a pressure sensor, a force sensor, an accelerometer, and/or a proximity sensor.

Having detected the force component applied to the user and/or the motion undergone by the user, at least one moveable member coupled to a head gear adapted to be worn by the user is caused 320 to be moved/displaced based, at least in part, on the detected one or more of the force component applied to the user, and the motion undergone by the user, so as to apply a counter force to a head of the user. In some embodiments, the moveable members that are caused to be moved may be implemented using, for example, a pneumatic piston/cylinder, an inflatable bag, an electromechanical motor, a piezoelectric actuator, etc. The at least one moveable member caused to be moved may be moved in a direction that is approximately (or substantially) opposite the direction at which the external force component detected was applied, and may be moved so as to apply a counter force with a magnitude related to the magnitude of the external impact force (e.g., with 10%, 20%, 50%, or 100% of the magnitude of the impact force, or any appropriate value that would counteract the effect of the external force or impact the user is or will be subjected to).

A number of implementations of the invention have been described. Nevertheless, it will be understood that various modifications may be made without departing from the spirit and scope of the invention. Accordingly, other embodiments are within the scope of the following claims.

What is claimed is:

1. A head gear device comprising:
a helmet adapted to be worn by a user, the helmet including an exterior surface and an inner surface defining a cavity adapted to be fitted on a head of the user;
at least one sensor secured to the helmet, the at least one sensor configured to measure one or more of force and motion; and
multiple moveable members coupled to the inner surface of the helmet, with one or more moveable members, selected from the multiple moveable members, configured to be controllably actuated, based on an electrical actuating control signal, to cause at least a part of each of the selected one or more moveable members to be displaced, in response to detection by the at least one sensor secured to the helmet of a detected external force component applied to the helmet, towards the head of the user such that the selected one or more moveable members move in a direction opposite an impact direction at which the detected external force component was applied to the helmet in order to apply a counterforce to the head of the user, the at least part of the each of the selected one or more moveable members being displaced with a displacement force computed from a magnitude of the detected external force component detected by the at least one sensor secured to the helmet.

2. The device of claim 1, wherein the at least one sensor includes one or more of: an inertia sensor, a contact sensor, a pressure sensor, a force sensor, an accelerometer, or a proximity sensor.

3. The device of claim 1, wherein the selected one or more moveable members are configured to be displaced in response to a determination, by a controller coupled to the helmet, that the detected external force component applied to the helmet exceeds a pre-determined force threshold.

4. The device of claim 1, wherein the selected one or more moveable members include at least one inflatable bag configured to be controllably inflated in the direction opposite the impact direction at which the detected external force component was applied, the at least one inflatable bag inflated with the displacement force computed from the magnitude of the detected external force component measured by the at least one sensor.

5. The device of claim 1, wherein the selected one or more moveable members include at least one motor to controllably actuate a shaft coupled to a moveable pad, the controllably actuated shaft configured to cause the moveable pad to be displaced in the direction opposite the impact direction at which the detected external force component was applied, and with the displacement force computed from the magnitude of the detected external force component measured by the at least one sensor.

6. The device of claim 1, wherein the selected one or more moveable members include at least one controllably actuated piezoelectric element mechanically coupled to a moveable pad, the controllably actuated piezoelectric element configured to cause the moveable pad to be displaced in the direction opposite the impact direction at which the detected external force component was applied, and with the displacement force computed from the magnitude of the detected external force component measured by the at least one sensor.

7. The device of claim 1, wherein the selected one or more moveable members include at least one controllably actuated pneumatic piston mechanically coupled to a moveable pad, the controllably actuated pneumatic piston configured to cause the moveable pad to be displaced in the direction opposite the impact direction at which the detected external force component was applied, and with the displacement force computed from the magnitude of the detected external force component measured by the at least one sensor.

8. A method comprising:
  detecting, by a device comprising at least one sensor secured to a helmet and a hardware-implemented controller, a detected external force component applied to a head of a user; and
  causing, by the device, selected one or more moveable members selected from multiple moveable members, coupled to an inner surface of the helmet that includes an exterior surface and the inner surface defining a cavity fitted on the head of the user, to be displaced, in response to the detected external force component applied to the helmet and detected by the at least one sensor secured to the helmet, towards the head of the user such that the selected one or more moveable members move in a direction opposite an impact direction at which the detected external force component was applied in order to apply a counterforce to the head of the user;
  wherein causing the selected one or more moveable members to be displaced comprises controllably electrically actuating, by the device, the selected one or more moveable members so as to cause at least a part of each of the selected one or more moveable members to be displaced in the direction opposite the impact direction at which the detected external force component was applied with a displacement force computed from a magnitude of the detected external force component.

9. The method of claim 8, wherein detecting the external force component comprises: detecting the external force component using the at least one sensor secured to the helmet, with the at least one sensor comprising one or more of: an inertia sensor, a contact sensor, a pressure sensor, a force sensor, an accelerometer, or a proximity sensor.

10. The method of claim 8, wherein causing the selected one or more moveable members to be displaced comprises: causing at least one of the selected one or more moveable members to be displaced in response to a determination, by the device comprising the at least one sensor and the hardware-implemented controller, that the detected external force component applied to the user exceeds a pre-determined force threshold.

11. The method of claim 8, wherein causing the selected one or more moveable members to be displaced comprises: controllably inflating at least one inflatable bag to cause the at least one inflatable bag to inflate in the direction opposite the impact direction at which the detected external force component was applied, the inflatable bag configured to be inflated with the displacement force computed from the magnitude of the detected external force component.

12. The method of claim 8, wherein causing the selected one or more moveable members to be displaced comprises: controllably actuating a shaft coupled to a moveable pad to cause the moveable pad to be displaced in the direction opposite the impact direction at which the detected external force component was applied with the displacement force computed from the magnitude of the detected external force component.

13. The method of claim 8, wherein causing the selected one or more moveable members to be displaced comprises: controllably actuating a piezoelectric element mechanically coupled to a moveable pad to cause the moveable pad to be displaced in the direction opposite the impact direction at which the detected external force component was applied with the displacement force computed from the magnitude of the detected external force component.

14. The method of claim 8, wherein causing the selected one or more moveable members to be displaced comprises: controllably actuating a pneumatic piston mechanically coupled to a moveable pad to cause the moveable pad to be displaced in the direction opposite the impact direction at which the detected external force component was applied with the displacement force computed from the magnitude of the detected external force component.

* * * * *